United States Patent [19]

Guay et al.

[11] Patent Number: 5,907,844

[45] Date of Patent: May 25, 1999

[54] DYNAMIC EXTERNAL CONTROL OF RULE-BASED DECISION MAKING THROUGH USER RULE INHERITANCE FOR DATABASE PERFORMANCE OPTIMIZATION

[75] Inventors: Todd Guay; Gregory Smith, both of Nashua, N.H.

[73] Assignee: Oracle Corporation, Redwood Shores, Calif.

[21] Appl. No.: 08/821,387

[22] Filed: Mar. 20, 1997

[51] Int. Cl.⁶ .................................................. G06F 17/30
[52] U.S. Cl. ...................... 707/100; 395/183.14
[58] Field of Search .................. 707/1, 5, 10, 100–104, 707/200–206; 395/183.14

[56] References Cited

U.S. PATENT DOCUMENTS

| | | | |
|---|---|---|---|
| 5,471,629 | 11/1995 | Risch ....................................... | 395/800 |
| 5,566,333 | 10/1996 | Olson et al. ............................. | 395/600 |
| 5,581,482 | 12/1996 | Wiedenman et al. ................. | 364/551.01 |
| 5,600,789 | 2/1997 | Parker et al. ......................... | 395/183.14 |
| 5,627,760 | 5/1997 | Slutsker et al. ........................ | 364/492 |
| 5,664,106 | 9/1997 | Caccavale ........................... | 395/200.54 |
| 5,708,590 | 1/1998 | Slutsker et al. ........................ | 364/492 |
| 5,732,240 | 3/1998 | Caccavale ................................ | 395/445 |
| 5,781,720 | 7/1998 | Parker et al. ....................... | 395/183.14 |

*Primary Examiner*—Thomas G. Black
*Assistant Examiner*—Ruay Lian Ho
*Attorney, Agent, or Firm*—Wagner, Murabito & Hao

[57] ABSTRACT

A method for providing persistent, dynamic external control of rule-based decision making through inherited user defined rules (UDRs) within a computer controlled relational database management system (RDBMs). Within the novel system, objects are grouped together in a parent-child hierarchy where a child has one parent and each parent can have multiple children. Each object can have one or more predefined ("hardcoded") rules associated with it; these hardcoded rules are executed in a sequence to arrive at parameter values which, when applied, tune the database environment. The novel system provides a mechanism for creating UDRs which are associated with a particular object and used by particular hardcoded rules which process the particular object. For a given hardcoded rule, if a processed object does not have a UDR defined within, then a search is made up the object's ancestry (e.g., its parentage) until a defined UDR is located within an ancestor object; this value is then used to modify the behavior of the hardcoded rule. The root of the object hierarchy contains defined UDRs ("base UDRs") for all hardcoded rules, so the above search is effective for all user rules. Before a hardcoded rule is executed, it automatically allows its associated UDR to customize data and/or execute a procedure. The UDRs offer a mechanism for customizing the performance tuning session based on external (user supplied) information and defining the scope of the attribute represented by the UDR from different levels of the object hierarchy.

16 Claims, 12 Drawing Sheets

40

|        | 1* | 2* | 3* | 4* | 5* | 6* | 7* | 8* | 9* | 10* | 11* | 12* |        |
|--------|----|----|----|----|----|----|----|----|----|-----|-----|-----|--------|
| UDR (1) |   |   |   |   |   |   |   |   |   |    |    |    | ~40(1) |
| UDR (2) |   |   |   |   |   |   |   |   |   |    |    |    | ~40(2) |
| UDR (3) |   |   |   |   |   |   |   |   |   |    |    |    | ~40(3) |

* * *
...

| UDR (N) |   |   |   |   |   |   |   |   |   |    |    |    | ~40(N) |

FIG. 5

DYNAMIC EXTERNAL CONTROL OF RULE-BASED DECISION MAKING THROUGH USER RULE INHERITANCE FOR DATABASE PERFORMANCE OPTIMIZATION

BACKGROUND OF THE INVENTION (1) Field of the Invention

The present invention relates to the field of computer systems used for storage, retrieval, and processing of information. More specifically, the present invention relates to the field of parameter evaluation methods for tuning an information management system, e.g., a relational database management system.

(2) Prior Art

The migration of computing from mainframe systems to downsized client/server environments has created the need for a new generation of systems management technology for managing and monitoring the health of dispersed and diverse open systems. Once such technology includes performance tuning of computer controlled relational database management systems (RDBMS) to improve their data processing efficiency.

Computer implemented RDBMS are well known in the art. These database systems commonly employ data tables that contain columns and rows. Many database systems include different software objects that are organized in a hierarchical or entity relation (ER) topology in which parent objects and child objects are related to each other in certain predefined manners. In this topology, each software object contains one or more attributes and rules which are used to alter certain aspects of the database system (e.g., vary maximum and minimum ranges, constraints, resource usage, etc.) in order to tune the database system for different operational environments. The attributes can have attached rules and, in certain circumstances, the rules are used to evaluate the attributes or other system values. There are prior art approaches for using these object-attached rules for tuning a database environment to increase data throughput performance (the act of tuning can also be called "performance tuning" or "optimizing performance" or "performance optimization"). In accordance with these approaches, a database administrator (DBA) performance tunes the database system based on a set of input information which describes a particular target environment.

As an example of an attribute, a "parameter" is a type of attribute and is a modifiable value that can be changed in order to influence the manner in which a database system responds and the manner in which database resources are allocated within a database system. FIG. 1 illustrates an exemplary hierarchical topology of instance parameters A–K. An instance parameter contains a set of rules defining the respective manner in which the parameter is to be evaluated and the dataset on which the parameter is dependent, if any. In order to provide an effective RDBMS environment (database environment), the parameters require tuning for a particular database program or "instance." In general, parameters influence the amount and manner in which the following computer resources are used for a given instance: CPU processing; input/output (I/O) resources; memory resources; and contention regarding the number of locks within a system. It is expected that, by performance tuning, data flow bottlenecks regarding these database resources can be reduced.

During the database performance optimization process, object-attached rules execute in sequences and potentially form conclusions regarding particular aspects of the database system that are tunable for a given environment. Optimization conclusions are based on three groups of information: 1) user-supplied performance data that is external to the rule; 2) embedded knowledge of database performance behavior within a rule; and 3) database performance knowledge constraints within a rule. Of the above three groups of information, the first group is traditionally unknown until the rule is ready to execute. The second group is hardcoded within the rule (e.g., using fixed program instructions that are not user-modifiable), and the third group is either hardcoded within the rule or loaded at run-time from a fixed external file in computer memory. Therefore, in the past, when a rule is executed, the output is based partly on variable user-data and non-variable fixed knowledge.

A problem arises when the non-variable fixed knowledge (e.g., of the second and third groups) needs to change dynamically based on some condition of the first group's data or some other external influence, e.g., to allow the optimization process to dynamically tune the database system for a particular environment. For the second group (the embedded knowledge of data performance behavior) multiple rules need to be written to handle all possible cases. For the third group, the fixed constraints need to be edited in the external file, or the values need to be changed dynamically within the rule. For the second and third groups, the step of modifying behavior still requires some prior knowledge of the possible changes. For example, given that a rule must handle 10 different database environments, there must be 10 versions of the rule. When modifying a third group constraint, the rule must know when the value is good for one type of decision but not good for another.

In the prior art, one approach for dynamically altering a rule provides a file of fixed attribute values which can be changed (thus altering the behavior of the rules which use the values) to allow the user to describe differences in the database environment. However, under this first approach, when a particular attribute in this file is altered, the new value is applied to all objects for all cases. Therefore, the first approach does not allow the use to discriminate between objects that share a common attribute value. For instance, during a tuning session it is not possible under the first approach for one instance (e.g., instance A) to have one value for parameter A and for another instance (e.g., instance B) to have another value for parameter A. Moreover, during a tuning session, assuming a schema has table A and table B, it is not possible to offer one type of index constraint for table A while offering another type of index constraint for table B. This result is disadvantageous because there are many cases where it would be desirable to discriminate between table A and table B during tuning. For example, table A might only be used for data retrieval (e.g., outputs only), while table B might only be used for transactions (e.g., input/output). Therefore, this first prior art approach of "tailoring" object attributes for a given tuning session is disadvantageous because once an attribute value is altered, it becomes all encompassing and uniformly applied to all objects for all database environments.

A second prior art approach for dynamically altering a rule is to particularly modify rules at the object level using fixed parameters to incorporate the needed information. While this second approach allows the user to discretely modify rules at the object level, it is disadvantageous for several reasons. Under one technique, if the user is allowed to provide fixed attributes for rules located within very high hierarchical object levels (e.g., near the root level), then the changes will influence a large number of lower objects. In this case, much like the first approach, the user is unable to make discrete object changes for the objects located in the lower hierarchical levels. Moreover, under a second technique, if the user is allowed to provide fixed parameters for rules located in low hierarchical levels, then all objects within the low hierarchical levels need to be modified individually. In some instances, there can be over 600 objects that utilize a particular modifiable attribute within a given low hierarchical level. Under this second technique, each of these objects would need to be individually modified in order to effect changes applicable for the modifiable attribute. Therefore, both of the above techniques of the second approach are undesirable because: 1) under the first technique, the modifications are too encompassing; and 2) under the second technique, the required modifications are too numerous to be practical.

Accordingly, what is desired is a tuning system that allows a user to readily define differences in system environments so that the database system can be dynamically performed tuned for these environments. What is needed, more particularly, is a system that allows a user to modify object attributes at the object level (thus particularly defining differences in system environments at the object level) without having each user modification apply to all objects uniformly. What is further desired is a mechanism that allows object-level rule modifications (e.g., that are tailored for a particular environment) within objects of a particular hierarchical level that does not also require custom modifications be made to a inordinate number of objects of that particular hierarchical level. As further described herein, the present invention provides these advantageous results.

SUMMARY OF THE INVENTION

A method and system are described for providing persistent, dynamic external control of rule-based decision making through inherited user defined rules (UDRs) within a computer controlled relational database management system (RDBMs). The present invention operates within a database performance optimizer for tuning a database system to a particular environment. Within the system of the present invention, objects are grouped together in a parent-child hierarchy where a child has one parent and each parent can have multiple children. Each object can have one or more attached predefined (e.g., "hardcoded") rules associated with it. These hardcoded rules are executed in a sequence to arrive at parameter values which, when applied, tune the database At system. The system of the present invention provides a mechanism for creating UDRs which are defined with respect to a particular object and are used by hardcoded rules which process the objects. For a given hardcoded rule, if an object does not have a UDR defined within, then a search is made up the object's ancestry (e.g., its parentage) until a defined UDR is located for the given user rule name. In this manner, UDRs can be inherited within the object hierarchy and then are used to influence the behavior of the hardcoded rule when processes the object. The root object of the object hierarchy contains defined UDRs ("base UDRs") for all hardcoded rules as a default condition, so the above search is effective for all user rules. In operation, before a hardcoded rule is executed, it automatically searches for its associated UDR and then pre-executes the UDR to customize data and or other conditions effecting the execution of the hardcoded rule. Therefore, the UDRs offer a mechanism for customizing the performance tuning session based on external (user supplied) information and defining the scope of the attribute represented by the UDR from different levels of the object hierarchy.

In general, user rules of the present invention allow a user to add knowledge about a target environment to the performance tuning session without requiring the addition of a new parameter. Therefore, a user can utilize the user rules to give the set of hardcoded rules externalizable inherent knowledge of what the hardcoded rules are trying to tune rather than using hardcoded attributes that, for example, may be appropriate for environment A but not appropriate for environment B. As such, user rules dynamically adjust the behavior of a hardcoded rule within the performance tuning session.

The present invention also provides the user default cases for variable conditions upon which the hardcoded rules depend. These default user rule definitions are placed into the root objects of the hierarchy and are therefore available to all objects, e.g., the scope of the default user rules in the root object can potentially cover all other objects. The precedence hierarchy previously described provides the user with maximum flexibility for identifying the scope of the user rule. Usability of the present invention is also maintained, since users who are content with the default user rule settings do not need to specifically define user rules within other objects. However, expert users have the flexibility to customize the user rule settings however they desire.

BRIEF DESCRIPTION OF THE DRAWINGS

FIG. 5 illustrates a row and column data structure used by the present invention for maintaining user generated user rules.

DETAILED DESCRIPTION OF THE INVENTION

In the following detailed description of the embodiments of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

SECTION I

Notation and Nomenclature

Some portions of the detailed descriptions which follow are presented in terms of steps, procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "storing" or "computing" or "calculating" or "determining" or "displaying" or the like, refer to the action and processes of a computer system (e.g., 112 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

Figure 1:
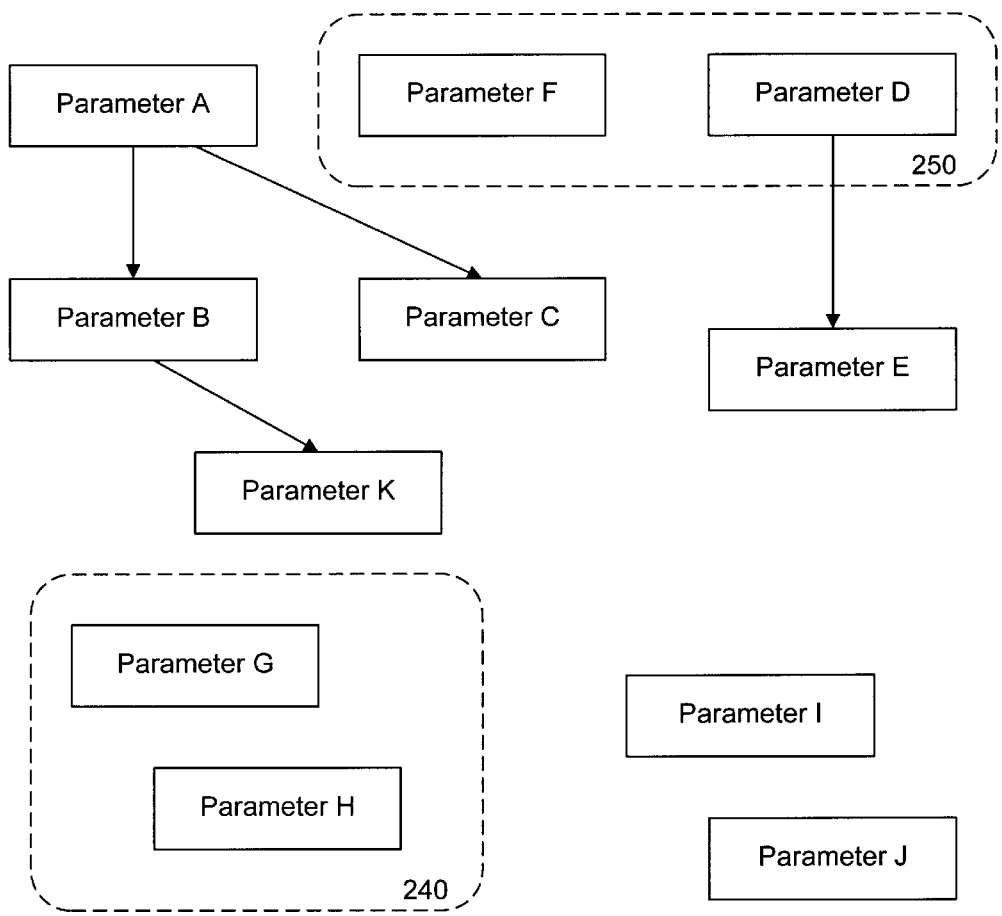
FIG. 1 illustrates an exemplary relationship between various instance parameter attributes that are tuned during a performance tuning session.
Figure 2:
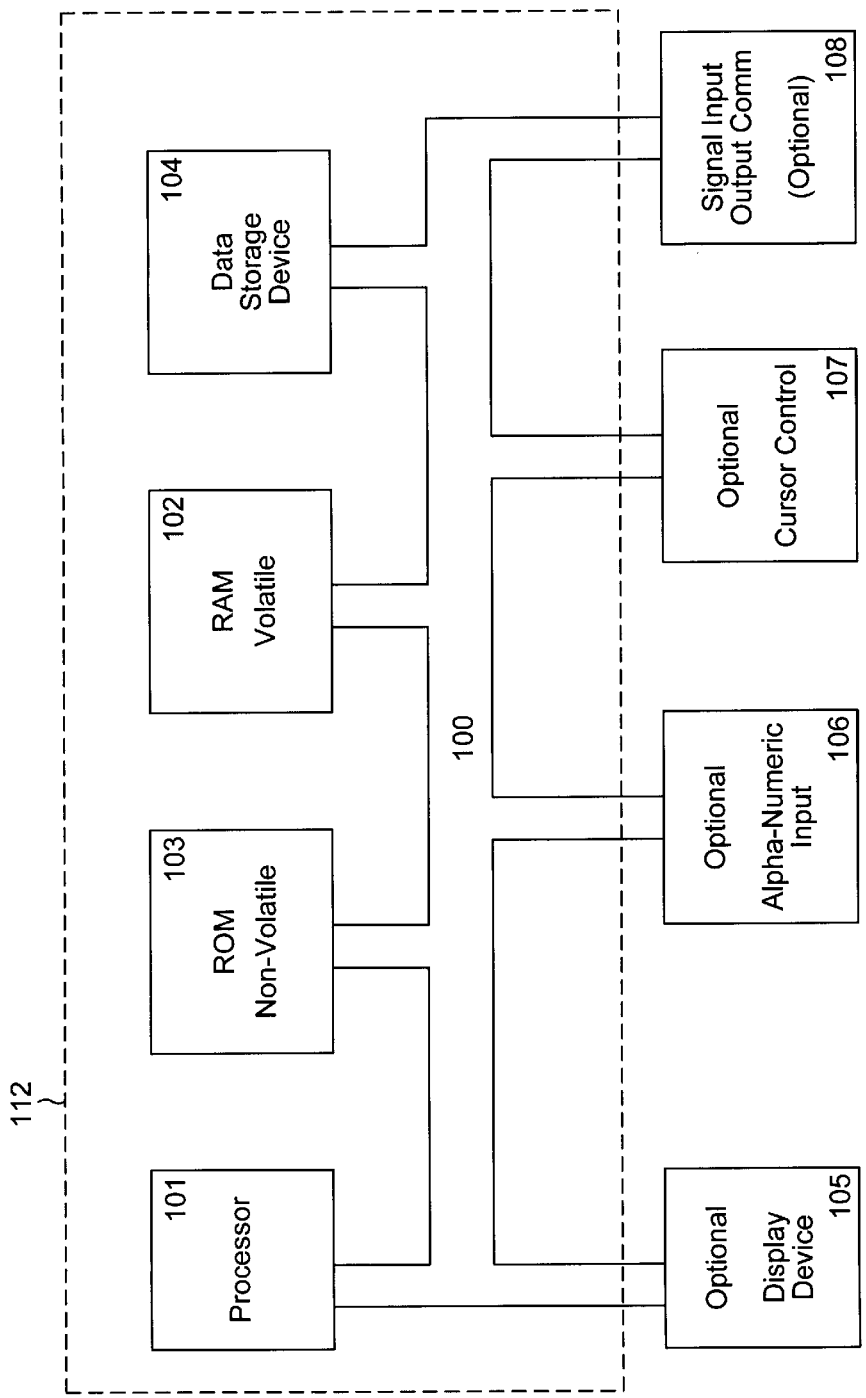
FIG. 2 illustrates a general purpose digital computer system upon which a database system is implemented in accordance with the user rules of the present invention.

Refer to FIG. 2 which illustrates an exemplary computer system 112. Within the following discussions of the present invention, certain processes and steps. (e.g., processes 600, 615, and 710) are discussed that are realized, in one implementation, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 (hard drive or floppy) such as a magnetic or optical disk and disk drive coupled with the bus 100 for storing information and instructions. Optionally, system 112 can include a display device 105 coupled to the bus 100 for displaying information to the computer user, an optional alphanumeric input device 106 including alphanumeric and function keys coupled to the bus 100 for communicating information and command selections to the central processor (s) 101, an optional cursor control device 107 coupled to the bus for communicating user input information and command selections to the central processor(s) 101, and an optional signal generating device 108 coupled to the bus 100 for communicating command selections to the processor(s) 101. In one exemplary implementation, system 112 is a DEC Alpha computer system manufactured by Digital Equipment Corporation, but could equally be of a number of various well known and commercially available platforms.

SECTION II

Object Hierarchy

Figure 3:
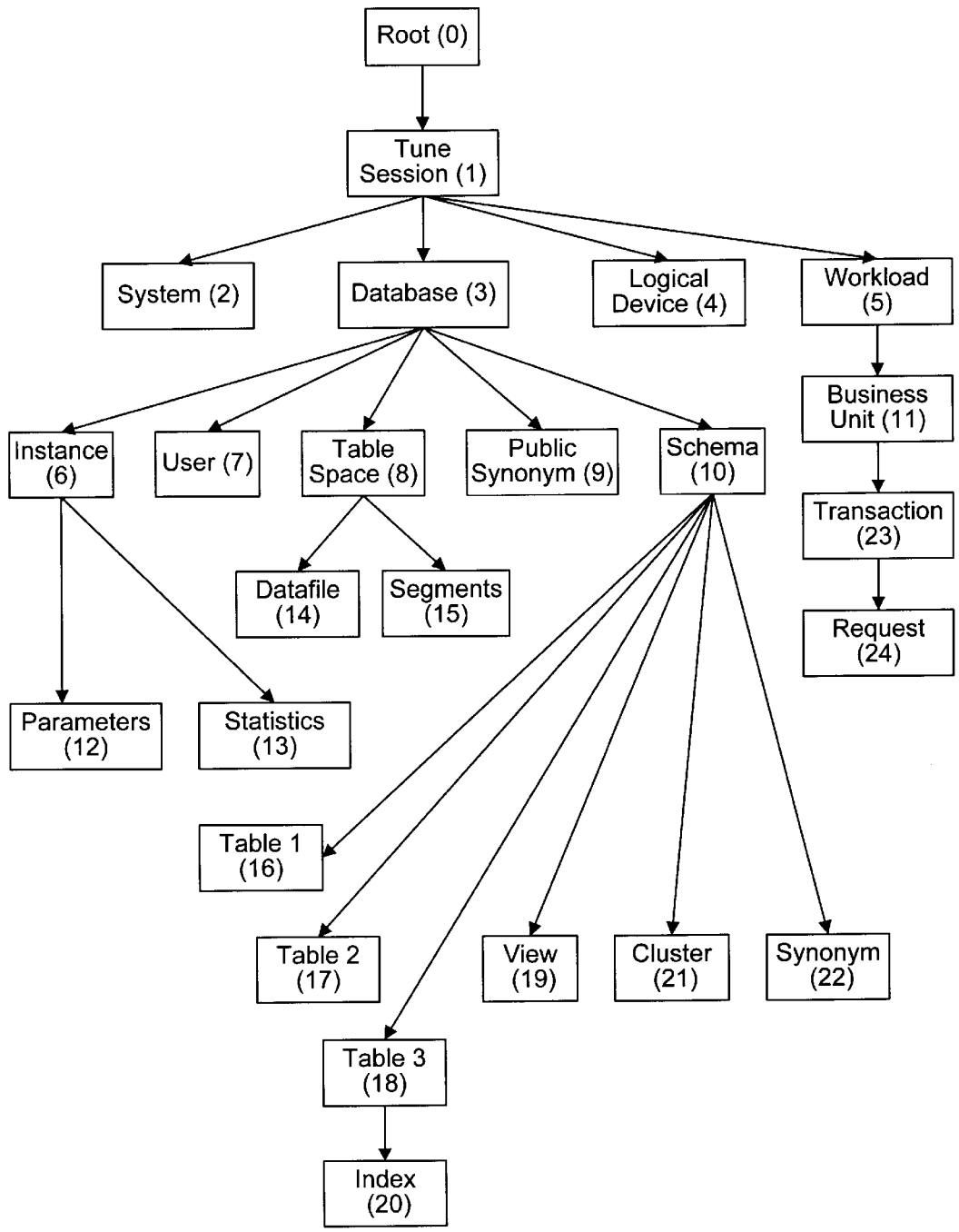
FIG. 3 shows a parent-child hierarchical relationship between objects of an RDBMS system utilized and upon which user rule inheritance is based in accordance with the present invention.

FIG. 3 illustrates a parent-child hierarchy 10 of objects which map to components of a database server architecture. Hierarchy 10 is an entity relationship (ER) topology of objects where a child object is "a part of" its parent object. Attributes within the objects of hierarchy 10 can be tuned with respect to a given database environment by adjusting the operation of rules which are attached to the objects such that the rules are aware of specific conditions of the given database environment. These objects can be represented as the hierarchy of tunable entities as shown in FIG. 3, where tune session object (1) represents the logical session to be tuned, and the children of the tuning session object (1) are organized using an "is-part-of" relationship. Within the tuning session, a user is able to identify certain attributes for tuning and interact with the tuning process as described below. At the completion of the tuning session, tuning session object (1) produces a set of recommended values to apply to the selected attributes. Under user control, these values can be applied to the attributes within tuning session object (1) to tune the database system to the given environment.

The hierarchy 10 of FIG. 3 is organized in an entity relation (ER) topology with parent and child objects where a child has one parent but each parent can have multiple children. For instance, the system object (2) and the logical device object (4) are each children of the tune session (1) parent object. The root object (0) is shown at the top of the hierarchy 10. In accordance with the present invention, all objects within the hierarchy 10 are numbered with identification numbers, (i), that are referenced from the root object (0) and sequentially increase down the hierarchy. In the embodiment shown in FIG. 3, the identification numbers are shown in parenthesis "(i)" with the root object having identification (0). The object identification numbers are assigned by the present invention such that as one traverses downward through the hierarchy, the object identification numbers increase in value.

An object as shown in FIG. 3 can include several (e.g., 1 to n) instantiations of itself within hierarchy 10. For instance, the table object, which is a child of schema object (10) includes three instantiations which are: table 1 object (16), table 2 object (17), and table 3 object (18). In this case, n=3. Although the rest of the objects of FIG. 3 are single (e.g., n=1), it is appreciated that any of the objects shown in FIG. 3 can have multiple instantiations (e.g., 2 to n) of itself. Within the present invention, each instantiated object is assigned its own identification number (i).

The tuning session object (1) of FIG. 3 includes a database object (3), a system object (2), a logical device object (4) and a workload object (5). The environment object is composed of system object (2) and device object (4). The system object (2) contains information such as the number of processors and the amount of total memory, etc., within the environment. The logical device object (4) contains information about the logical I/O devices, such as the I/O rate, number of I/O devices, and device size, etc.

Objects (6)–(9) and (12)–(15) of FIG. 3 are specific to the database object (3) to which they belong. Examples of objects that are children of database object (3) include the logical schema object (10), one or more instance objects (6) and tablespace object (8). Each child of the database object (3) can have one or more children of its own. For example, tablespace object (8) includes datafile object (14) and segment object (15) while instance object (6) contains parameter objects (12) and statistics objects (13). Instance parameter objects are described in more detail in copending application Ser. No. 08/772,298, entitled "Non-Recursive Method for Parameter Evaluation within an Information Management System," filed on Dec. 23, 1996, and assigned to the assignee of the present invention. Further, schema object (10) includes table 1 object (16), table 2 object (17), table 3 object (18), view object (19), cluster object (21), and synonym object (22). Table 3 object (18) contains index object (20).

As used above, a schema object (10) is a collection of objects. Schema objects are the logical structures that directly refer to the database's data. Schema objects include such structures as tables (see below) 24, views (a custom presentation of data table), sequences, stored procedures, synonyms, indexes, clusters, and database links. Objects in the same schema can have different tablespaces, and a tablespace can hold objects from different schemas. A table object, e.g., object (17), is the basic unit of data storage an exemplary RDBMS system. The tables of a database hold all of the user-accessible data. Table data is stored in rows and columns and each table is given a table name and a set of columns (columns are defined by column name, data type and width). A tablespace object (8) is a logical storage unit within a database and is used to group related logical structures together. For example, tablespaces commonly group all of an application's objects to simplify certain administrative operations. One or more data files are typically explicitly created for each tablespace.

ATTRIBUTES

Each object of FIG. 3 is composed of one or more attributes. Attributes defined for an object include data, control information, constraints (which alter the behavior of specific rules), and general rules. Relationships between objects can be expressed as dependencies between their attributes (e.g., data dependencies). An attribute can have its value modified to influence the manner in which the database environment responds. Attribute decisions impact, or can be impacted by, the resources available to the database environment. In effect, attribute values control the environment of the database system; they provide a mechanism, e.g., "pool of knobs," for defining and adjusting the environment of the database system. Attributes control the allocation of the resources (within the database system) that are given to the database system from the computer system's operating system. If the attributes are adjusted such that insufficient resources are provided for the database environment, data flow in the database system can have severe bottlenecks and will not flow smoothly. If the attributes are adjusted to provide excess resource to the database environment, system resources can be wasted on the particular database system.

Attributes include rules which are used to define or evaluate the attribute. Because attributes are associated with objects within hierarchy 10 of FIG. 3, it follows that rules are likewise associated (e.g., "attached") with the objects. The present invention utilizes two major types of rules: 1) hardcoded rules which, in general, are not modified by a user during performance tuning; and 2) user defined rules which are also called "UDRs" or "user rules" herein. Note that "base" rules, which are discussed further below, are a special form of user rules that are defined in root object (0).

In accordance with the present invention, a hardcoded or "predefined" rule applicable for given object locates and executes its associated user rule or user rules (there can be multiple user rules defined for a predefined rule) before it itself executes. By defining and using user rules, the user can pass information regarding a particular database environment to the set of hardcoded rules within hierarchy 10 which will thereby performance tune the database system to the particular database environment.

USER RULES OF THE PRESENT INVENTION

User rules of the present invention allow a user to modify or influence the operation of a hardcoded rule which is attached to or applicable for an object in the hierarchy 10 (FIG. 3). For instance, as data is processed within an RDBMS, specific objects (e.g., table objects) that comprise the data are processed. When a given table object is processed, a particular hardcoded rule applicable for that table object can be invoked as part of the table object's processing. It is appreciated that the particular hardcoded rule can apply to many other objects in addition to the table object because any hardcoded rule can apply to multiple objects or entire classes of objects. Before the particular hardcoded rule is executed, any user rules that can alter the behavior of the particular hardcoded rule are located in accordance with the present invention. As discussed below, the particular definition of the located user rules depends on the identifier of the table object (for example) that is being processed.

User rules are defined with respect to a particular object and are associated therewith according to the object's identification number. A user rule is made unique by having (1) a user rule name and (2) an associated classification. The classification defines the "type" of user rule, e.g., a table rule, an index parameter rule, an index analysis rule, or an instance parameter rule, etc. A user rule is also defined with respect to a particular hardcoded rule which is applicable for the object and is associated therewith by the hardcoded rule's name. In this format, a user rule provides the user with a mechanism for discriminating between objects of a same hierarchical level during a tuning session thereby allowing the user to tailor rules of an object for different database environments. Within the present invention, by definition, the scope of influence of a user rule includes the object for which the rule is defined and that object's children. More specifically, within the scope of the present invention, a child object inherits any user rules defined for its parent object unless a specific user rule has been explicitly defined for that child, in which case the child object's user rule takes precedence. It is appreciated that a child object's parent, grandparent, great-grandparent, etc., are all ancestor objects of the child object.

Furthermore, a user rule can be used by multiple hardcoded rules and one hardcoded rule can be applicable for or attached to multiple objects or classes of objects.

As described above, each hardcoded rule within the present invention contains a provision which examines first if any associated user rules are to be executed before the hardcoded rule itself executes. The present invention provides a mechanism whereby a defined user rule can vary the value of an attribute used (e.g., as input value) by the hardcoded rule and, in this way, vary the operation and/or the result of the associated hardcoded rule. The user rule can particularly tailor a given object to a particular database environment. Further, in view of the logical inheritance features provided by the present invention which apply to user rules, the user is not burdened with generating and assigning a inordinate number of rules within the object hierarchy because objects not having a particular user rule defined for a particular hardcoded rule can inherit one from its parent object.

User defined rules associated with the root object (0) of FIG. 3 are a special class of user rules referred to as "base" user rules or "base" rules or default user rule definitions. In accordance with the present invention, there is a base rule explicitly defined for each user rule used by the objects of hierarchy 10. The base rules are default user rules and since they are located in the root object (0), they can be inherited by all objects of hierarchy 10. Base rules are utilized by the present invention in cases when the user has not specified (e.g., defined) any specific user defined rules for a given object. Base rules are created by knowledge engineers that implement sets of rules and are meant to represent the nominal case. In one embodiment, base rules are loaded into a repository in memory 102 of system 112 (FIG. 2) during the first access to the database system. Subsequent accesses to the repository reference the rules directly from the schema object (10).

Figure 4A:
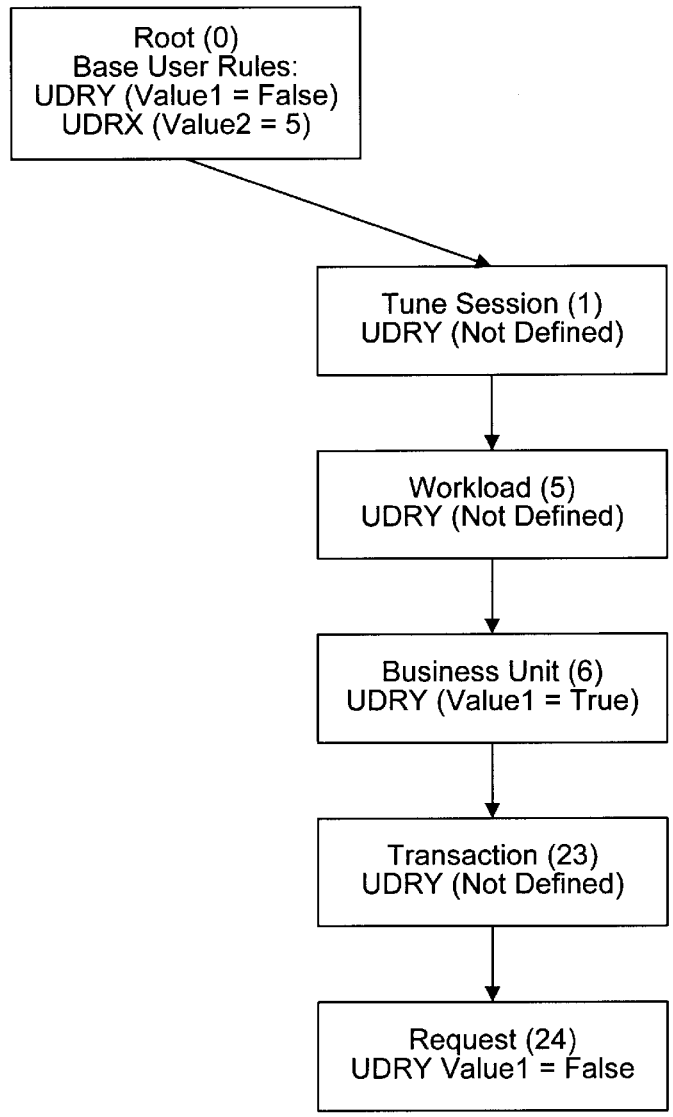
FIG. 4A illustrates a portion of the hierarchy shown in FIG. 3 which illustrates user rule inheritance across different hierarchical levels in accordance with the present invention.

FIG. 4A illustrates an exemplary hierarchical portion 15 of hierarchy 10 (FIG. 3). Portion 15 illustrates user rule inheritance in accordance with the present invention for different hierarchical levels assuming an exemplary user rule called UDRY. This user rule, UDRY, is by default defined as a base rule with respect to root object (0). In this example the user rule, UDRY, is further defined with respect to a particular hardcoded rule, e.g., called HRZ. When user rule UDRY of root object (0) executes, it assigns "value1" to false and returns this value. Value 1 is assumed to be a variable or other input that is used by hardcoded rule HRZ for evaluating a result which is used for optimization. In many cases, the result of a hardcoded rule is the evaluation of an object's attribute or parameter.

The determination of the particular value of the user rule, UDRY, for each object of FIG. 4A is now discussed in accordance with the present invention. For the child object, tune session (1), this object inherits the definition of user rule UDRY from its parent root (0) since UDRY is not defined for object (1) but is explicitly defined in root (0). User rule UDRY therefore assigns value1 to false for object (1). Child object, workload (5), inherits the definition of user rule UDRY from its parent, tune session (1), since UDRY is not defined for object (5) but is explicitly defined in tune session (1). User rule UDRY therefore assigns value1 to false for object (5). However, business unit object (6) does not inherit any user rule for UDRY because a specific user rule for UDRY is explicitly defined for object (6) and it assigns value1 to true. User rule UDRY therefore assigns value1 to true for object (6). Transaction object (23) inherits the definition of user rule UDRY from its parent object, business unit (6), since UDRY is not defined for transaction object (23) but is explicitly defined in business unit (6). User rule UDRY therefore assigns value1 to true for object (23). Request object (24) does not inherit any user rule for UDRY because a specific user rule for UDRY is defined for object (24) and it assigns value1 to false. User rule UDRY therefore assigns value1 to false for object (24).

Therefore, during tuning, the exact value for value1 used by the hardcoded rule UDRY within FIG. 4A is false for root object (0), false for tune session object (1), false for workload object (5), true for business unit object (6), true for transaction object (23) and false for request object (24) thereby allowing the user to discretely alter the operation of the hardcoded rules which (1) operate on the individual objects of FIG. 4A and (2) contain the user rule, UDRY, within their definition, one of which is called HRZ in the above example.

Figure 4B:
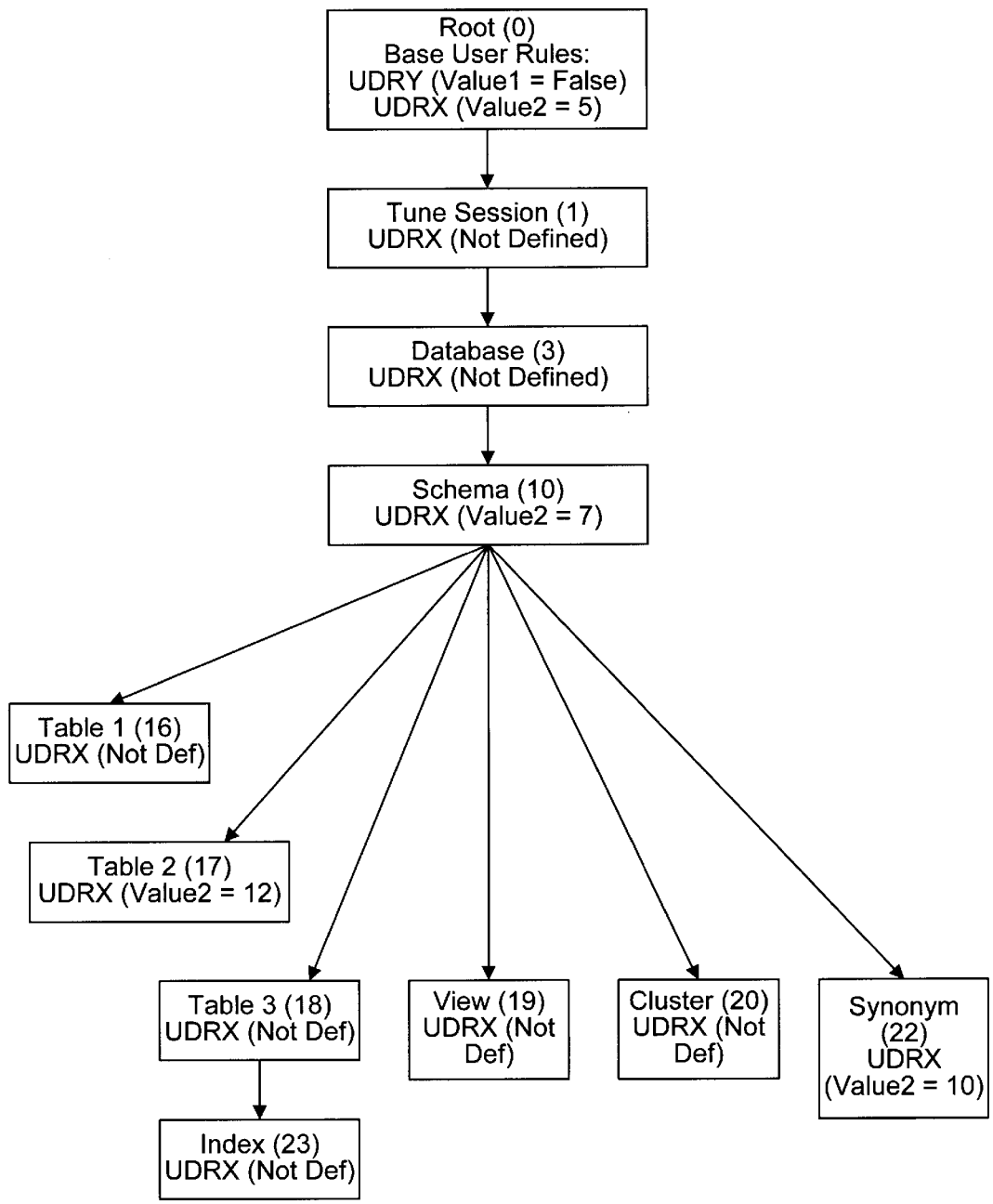
FIG. 4B illustrates a portion of the hierarchy shown in FIG. 3 which illustrates user rule inheritance of the present invention across different hierarchical levels and within the same level in accordance with the present invention.

FIG. 4B illustrates an exemplary hierarchical portion 20 of hierarchy 10 (FIG. 3). Portion 20 illustrates user rule inheritance in accordance with the present invention for between objects of different hierarchical levels and for objects of the same hierarchical level. This example assumes an exemplary user rule exists called UDRX. This user rule is by default defined as a base rule in the root object (0) and is used by a hardcoded rule called HRN for simplicity. HRN receives the value of value2 as an input argument. User rule UDRX for root object (0) assigns "value2" to 5 when it executes. Since the user rules are not defined for UDRX in tune session object (1) and for database object (3), both of these objects inherit the user rule (value2=5) from the root object (0) which contains the corresponding explicit definitions. Because schema object (10) particularly defines a user rule for UDRX, it does not inherit for UDRX and returns a value of 7 for value2.

With respect to the children of schema object (10) in FIG. 4B, the following objects do not have user rules explicitly defined for UDRX and therefore inherit user rules for UDRX from schema object (10) which provides the explicit definition: table1 object (16), table3 object (18); view object (19); and cluster object (20). However, the following children of schema (10) have explicitly defined user rules for UDRX: table2 object (17); and synonym object (22). Table2 object (17) uses a value of 12 for value2 and synonym object (22) uses a value of 10 for value2. Index object (23), child of table 3 (object 18), inherits its UDRX value from schema object (10). The following list illustrates values of value2 used for each object of FIG. 4B for UDRX during tuning: root (0), value2=5; tune session (1), value2=5; database (3), value2=5; schema (10), value2=7; table1 (16), value2=7; table2 (17), value2=12; tableS (18), value2=7; view (19), value2=7; cluster (20), value2=7; synonym (22), value2=10; and index (23), value2=7. It is appreciated that value2 is used as an input to the hardcoded rules named HRN can operate on each object of FIG. 4B in this example.

Using the inheritance technique shown in FIG. 4B, a user can define a user rule for an upper level object, e.g., schema object (10), for a given rule and this use rule applies to all its child objects for the given rule. Then, the user can explicitly define user rules for the given rule within certain child objects to alter the general application of the user rule as defined in the parent. As another example, assume a user rule is defined on the table1 object (16) of FIG. 4A which limits the maximum number of index segments to 5. By default, assume the value for the maximum_index_segments user rule at the root object (0) is also 5. The object hierarchy from the root object (0) to the index object (23) is shown below:

root(0)→tune session(1)→database(3)→schema(10)→table3(18)→index(23)

The user can change the user rule for maximum_index_segments at any of these levels, depending on the specific requirements of their environment. For example, if the user wants to have no more than 3 index segments on any indexes in the user's database, the user can instantiate the user rule at the database (3) level with a value of 3. If table2 (17) has special requirements that allow there to be 10 index segments, the user can instantiate a user rule for table2 (17) to allow 10 index segments there. Note that without more, table1 (16) and table3 (18) will continue to be restricted by the value of 3 index segments that was defined at the database (3) level. The user rule inheritance technique of the present invention thus provides the user with a mechanism for individually altering child objects by explicit user rule definition without necessitating an inordinate amount of user rule modifications at the lower level objects.

Figure 4C:
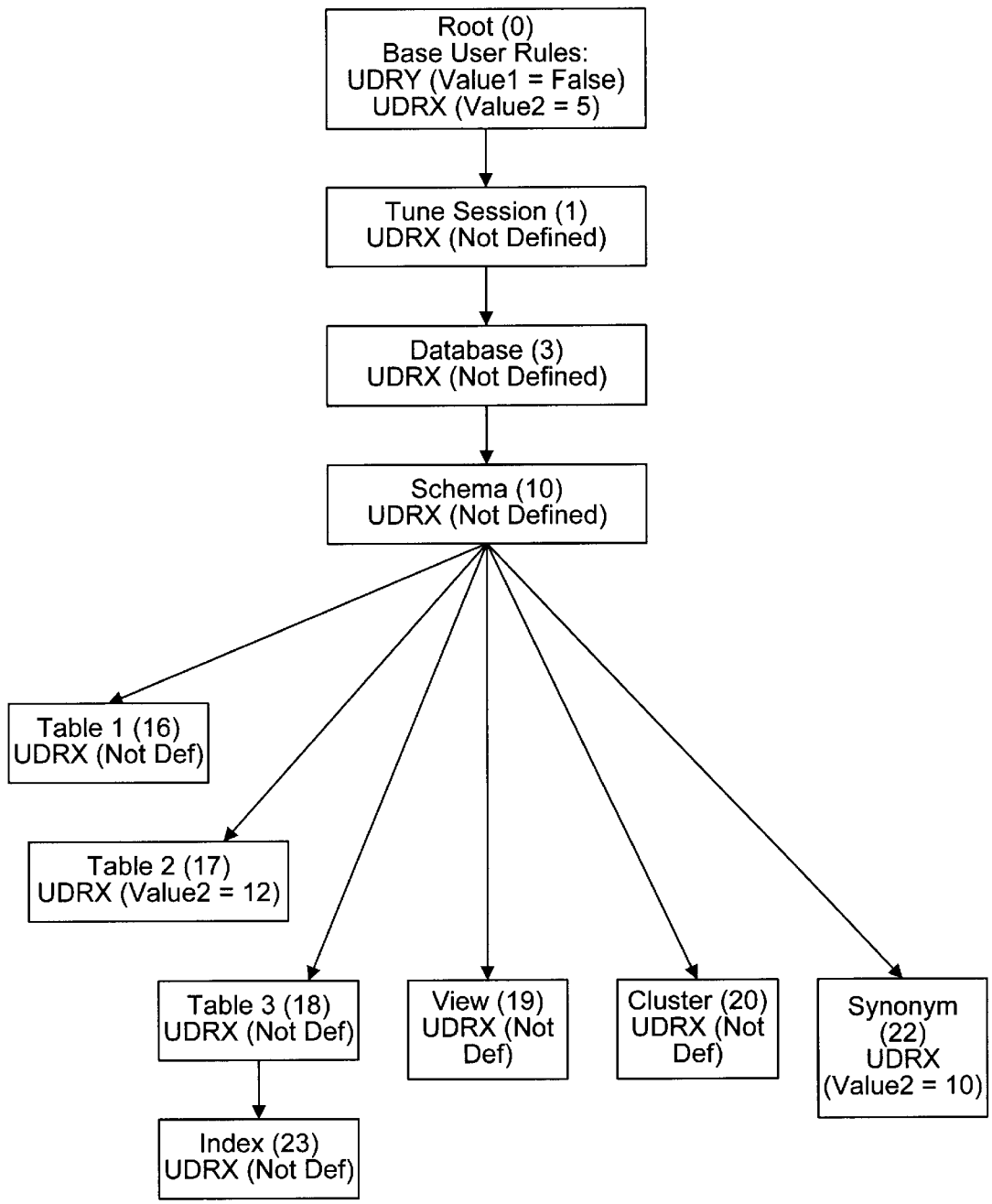
FIG. 4C illustrates the hierarchical portion of FIG. 4B but with different use rule definitions to illustrate user rule inheritance of the present invention across different hierarchical levels and within the same level.

FIG. 4C illustrates a hierarchical portion 25 similar to 20 except the user rule for UDRX is not explicitly defined in schema object (10). In this case, schema object (10) inherits the base rule (value2=5) stored in the root object (0) for UDRX because its parent objects, tune session object (1) and database object (3), do not have a user rule explicitly defined for UDRX. Likewise, the following children of schema object (10) inherit their user rule definition for UDRX because they do not explicitly have a user rule defined for UDRX: table1 object (16), table3 object (18); view object (19); and cluster object (20). Index object (23), child of table3 object (18), inherits its definition of UDRX from the root object (0). However, like FIG. 4B, the following children of schema (10) have explicitly defined user rules for UDRX: table2 object (17); and synonym object (22). Table2 object (17) uses a value of 12 for value2 and synonym object (22) uses a value of 10 for value2. The following list illustrates values of value2 used for each object of FIG. 4C for their attached hardcoded rule UDRX: root (0), value2=5; tune session (1), value2=5; database (3), value2=5; schema (10), value2=5; table1 (16), value2=5; table2 (17), value2=12; table3 (18), value2=5; view (19), value2=5; cluster (20), value2=5; synonym (22), value2=10; and index (23), value2=5

Figure 4D:
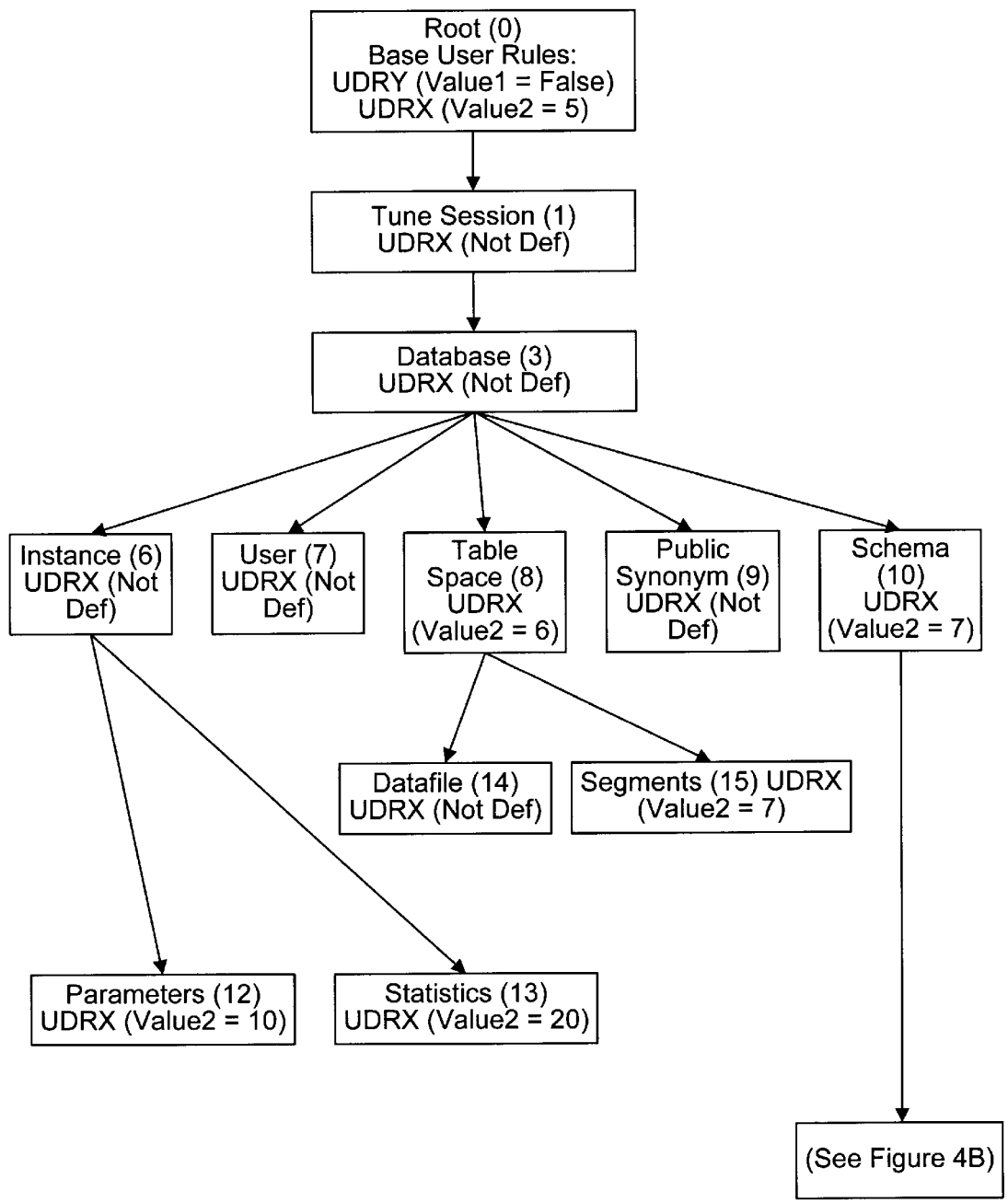
FIG. 4D illustrates another hierarchical portion of the hierarchy shown in FIG. 3 which illustrates user rule inheritance of the present invention across different hierarchical levels and within the same level.

FIG. 4D illustrates another exemplary hierarchical portion 30 of hierarchy 10 (FIG. 3). Portion 30 illustrates user rule inheritance in accordance with the present invention for different hierarchical levels and for objects of the same hierarchical level. Assume the exemplary user rule exists called UDRX. This user rule is by default explicitly defined as a base rule with respect to the root object (0) and is part of the definition of a hardcoded rule called HRL. HRL uses the value associated with value2 as input argument. User rule UDRX for root object (0) assigns "value2" to 5. Since the user rules are not explicitly defined for UDRX in tune session object (1) and for database object (3), both of these objects inherit the user rule (value2=5) from the root object (0). Instance object (6) also inherits the user rule definition from the root object (0), but its children, parameters object (12) and statistics object (13), each have their own explicitly defined user rule definitions for UDRX, which are value2=10 and value2=20, respectively. User object (6) and public synonym object (9) also inherit their user rule definitions from the root object (0). Table space object (8) does not inherit user rule definitions from it parent object because it has an explicitly defined user rule definition for UDRX (value2=6). Datafile object (14) inherits its user rule for UDRX from its parent table space object (8) but segments object (15) does not since it has its own explicitly defined user rule for UDRX (value2=7). Schema object (10) does not inherit a user rule for UDRX since it has its own explicit definition (value2=7). The inheritance for children and grandchildren of schema object (10) are shown with respect to FIG. 4B as indicated.

The exemplary hardcoded rule HRL operates on each object of FIG. 4D. The following list illustrates values of value2 that are defined for each object of FIG. 4D and used by hardcoded rule HRL when it executes on them individually: root (0), value2=5; tune session (1), value2=5; database (3), value2=5; instance (6), value2=5; parameters (12), object2=10; statistics (13), value2=20; user (7), value2=5; table space (8), value2=6; datafile (14), object2=6; segments (15), value2=7; public synonym (9), value2=5; schema (10), value2=7; table1 (16), value2=7; table2 (17), value2=12; table3 (18), value2=7; view (19), value2=7; cluster (20), value2=7; synonym (22), value2=10; and index object (23), value2=7.

FIG. 5 illustrates a data structure 40 used by the present invention to store and reference user rules. It is appreciated that data structure 40 can be stored in cells of various computer readable memory units of system 112 (e.g., unit 102 or unit 104) and accessed by processor 101 using bus 100.

Within structure 40, an individual row of rows 40(1)–40(n) is used to store an individual user rule. In the example shown in FIG. 5, user rule (1) is stored in row 40(1), user rule (2) is stored in row 40(2), user rule (3) is stored in row 40(3), and user rule (n) is stored in row 40(n). As the user defines additional user rules, they are added, row-wise, to the structure 40 and maintained by system 112. The columns, 1* through 12* contain specific information that is used to define each user rule including: (1) the object to which the user rule is associated (e.g., attached); and (2) the hardcoded rule for which the user rule is defined. Table 1 below illustrates a particular break down of what each column of structure 40 contains for each user rule.

TABLE 1

| Column | Information Contained Therein |
|---|---|
| 1* | Object to which the user rule applies |
| 2* | Hardcoded rule name that is defined to allow user rule to influence its operation |
| 3* | User rule data type (e.g., floating point, fixed, string, Boolean, etc.) |
| 4* | User rule value (e.g., value2=5) |
| 5* | User rule textual description |
| 6* | User rule textual help |
| 7* | Hidden (true/false). True indicates that the user rule is not visible from the user interface. |
| 8* | Read only (true/false). True indicates that users are not allowed to change the user rule. |
| 9* | Advanced (true/false). Advanced user rules are only shown by special user request. |
| 10* | Minimum Valid Value. Used to validate use rule when user modifications are attempted. |

TABLE 1-continued

| Column | Information Contained Therein |
| --- | --- |
| 11* | Maximum Valid. Used to validate use rule when user modifications are attempted. |
| 12* | Edit flags. This contains control information to alter graphic user display. |

The following example illustrates the alloc_fail_percent user rule definition for an exemplary instance parameter called shared pool reserved size:

user_rule:: create(XP_K_OBJ_IP_SPR_SIZE_
  MIN_ALLOC, "alloc_fail_percent",
  XPUR_K_DT_FLOAT, 90.0,
  "Allocation Failure Threshold",
   "This user rule determines the percentage of the maximum allocation failure size used to recommend the minimum allocation threshold. This rule only plays a role when segment size information is missing from the repository", false, false, true, 0, 100);

where: the object to which the user rule is attached is called "XP_k_OBJ_IP_SPR_SIZE_MIN_ALLOC"; the hardcoded rule name which uses the user rule (e.g., as an input) is called "alloc_fail-percent"; the user rule data type is "XPUR_K_DT_FLOAT" (floating point); the user rule value returned is 90.0; the first textual passage is the user rule textual description or name and can include a classification indication; the second textual description is the user rule textual help; hidden is false; read only is false; advanced is true; min valid value is 0; and max valid value is 100.

It is appreciated that the object identification field (field 1* above) can be a distinct object name (e.g., text) or the object identification number shown as number within parenthesis in FIG. 3–FIG. 4D. In either format, the object identification format stored in field 1* in structure 40 is a unique code used to identify a unique object within the hierarchy 10.

As an example of user rule usage, a hardcoded rule that is to operate on or with a particular object gains access to the appropriate user rule for that object in accordance with the present invention by specifying the current object identification, object type, and user rule name of interest. An example of this is shown using an exemplary format:

maximum_pqo_servers=user_rule::get_value(xp_
  instance.instance, XP_K_OBJ_IP_PARAL_
  MAX_SERVERS, "maximum");

which causes the user rule search engine (FIG. 8) of the present invention to search up the object hierarchy (e.g., hierarchy 10 of FIG. 3) from the instance object (6), to the database object (3), to the tune session object (1), to the root object (0) until a value for parallel max servers maximum has been located. The first value found in this path from the child object (6) to the root object (0) is then returned for use with the associated hardcoded rule. The allows the present invention to alter the behavior of the hardcoded rule for each object on which it operates within hierarchy 10.

PROCESS OF THE PRESENT INVENTION

The following describes the operation of user rule inheritance and use of user rules by hardcoded rules in accordance with the present invention. This discussion describes certain flow diagrams which represent process or control flow followed by processor 101 of system 112. The steps are implemented as program code stored in computer readable memory units of system 112 and executed by processor 101.

Figure 6:
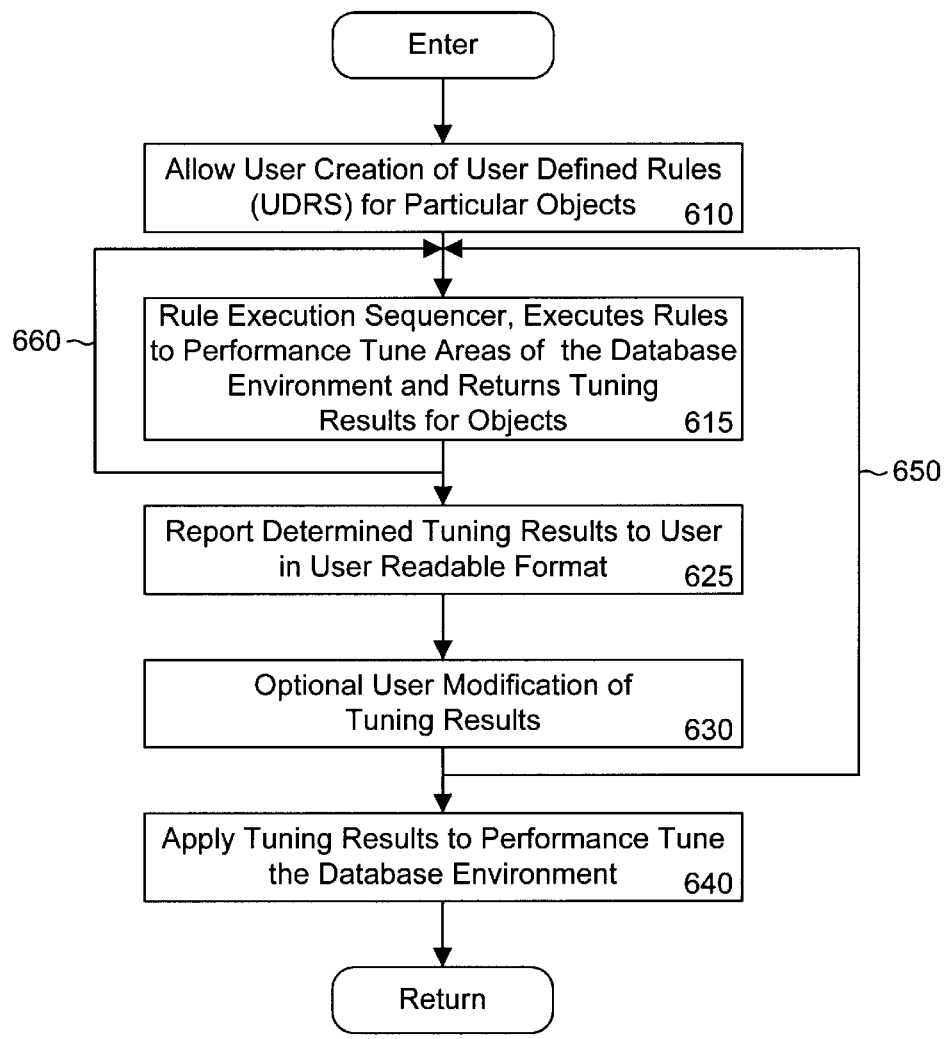
FIG. 6 is a high level flow diagram illustrating steps of the present invention for defining user rules and then using user rules for performance tuning of a database system.

A Process 600 of FIG. 6 is a high level flow diagram of the present invention. At step 610, the present invention allows the user to define particular user rules (UDRS) for particular identified objects. Within step 610, a graphical user interface (GUI) is employed which displays, in one embodiment, a graphical representation of portions of the object hierarchy 10 shown in FIG. 3 to the user. The user is allowed to select a particular object within hierarchy 10 using an user-interface device (e.g., a keyboard or cursor, etc.). Once an object is selected, the present invention displays to the user all of the possible user rules that can be defined for that object. This list is dependent on the number of hardcoded rules that are attached to the selected object. Upon the user selecting a particular user rule to define (e.g., either a modification of an existing user rule or a new user rule), step 610 allows the user to (1) enter a particular value for the user rule or (1) allows the user to define a particular piece of program code for the user rule. Once the user rule is defined or modified, the data structure 40 (FIG. 5) is then updated. At step 610, users can modify, create or delete user rules. The user can continually create, modify or delete user rules for different objects by returning to the hierarchy 10 display. Using step 610, the user can supply information particular to a given database environment so that the hardcoded rules of the objects of hierarchy 10 can then be tuned to that given database environment.

When the user is finished with updating user rules, step 615 of FIG. 6 is entered. At step 615, the present invention performs performance tuning by processing data associated with the objects of hierarchy 10. As an object is processed, any hardcoded rules that are required for this object processing are scheduled for execution. In this manner, hardcoded rules that are attached to or applicable for certain objects of hierarchy 10 are executed in order. The hardcoded rules are executed in turn as represented by path 660. In accordance with the present invention, as the hardcoded rules are executed, they access associated user rules (e.g., user rules that are incorporated within the definition of the hardcoded rule) that might alter the manner in which the hardcoded rules operate.

The user rule that any particular hardcoded rule accesses is defined by the object on which the hardcoded rule operates. After execution, the hardcoded rules produce recommended attribute values. A number of different rule execution sequences can be employed within the scope of the present invention at step 615. One such execution sequence technique is disclosed in copending application Ser. No. 08/772,298, entitled "Non-Recursive Method for Parameter Evaluation within an Information Management System," filed on Dec. 23, 1996, and assigned to the assignee of the present invention. At the completion of step 615, the present invention at step 625, provides a user readable list or report of recommended attribute values for application to the RDBMS system to tune the system for the given database environment.

At step 650 of FIG. 6, the user can modify the values within the report or can use the values as originally submitted. If modifications are performed, then as shown by path 650, a second iteration of performance tuning is required. At step 640, the user approved set of recommended attribute values are applied to the computer system 112 to tune the RDBMS for a particular database environment that was described at step 610 with respect to user rules.

Figure 7A:
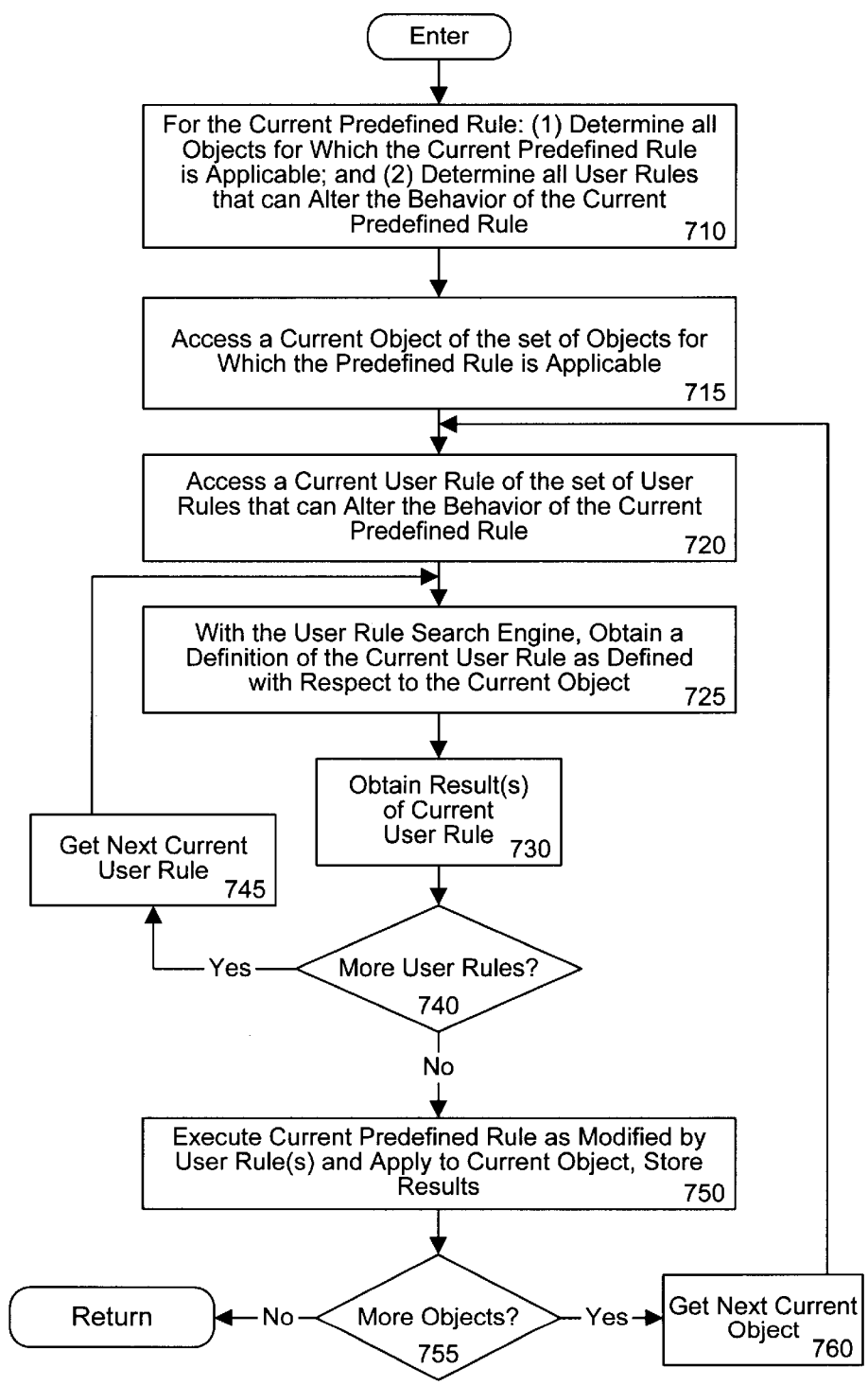
FIG. 7A and FIG. 7B illustrate steps of a process of the present invention for executing rules of the object hierarchy during performance tuning of a database system where rule execution involves the accessing and execution of attached user rules.
Figure 7B:
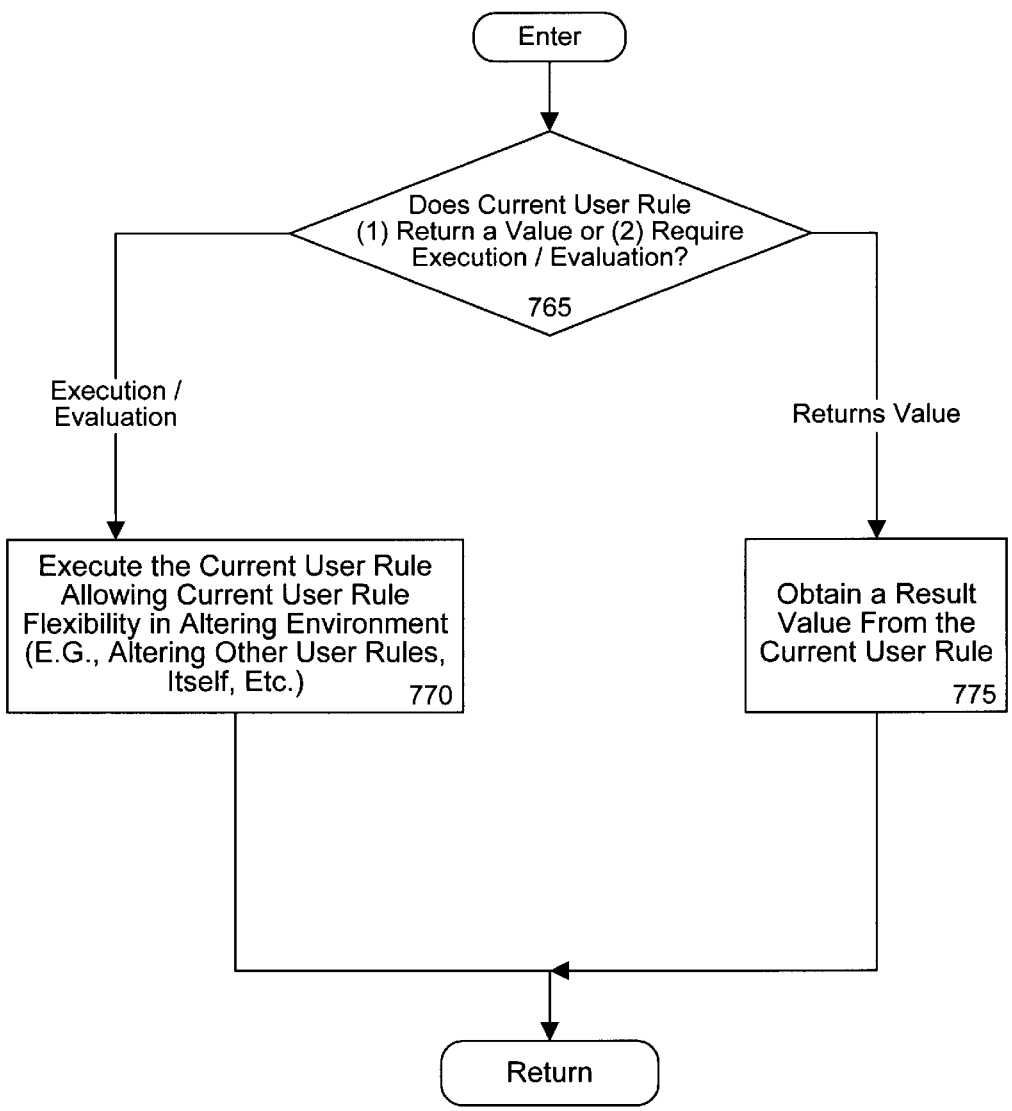

FIG. 7A and FIG. 7B illustrate the steps within process 615 of FIG. 6 that perform "user-rule influenced" hardcoded rule execution. The steps of process 615 are implemented as program code stored in computer readable memory units of system 112 and are executed by processor 101. Process 615 is responsible for selecting a particular hardcoded rule for execution, fetching the appropriate user rules (according to user rule inheritance within object hierarchy 10) that are associated with the particular hardcoded rule and which are defined by the object or objects being processed by the particular hardcoded rule. Process 615 then executes the hardcoded rules, as modified in operation by the user rules.

More specifically, at step 710 of FIG. 7A, the present invention determines all objects that the particular or "current" hardcoded rule operates on and then determines all user rules (e.g., 0 . . . n) that can alter the behavior of the particular hardcoded rule. The set of objects on which the particular hardcoded rule executes is typically given by the data processing portion of the RDBMS at step 710 and is therefore an input to process 710. (In fact, it is usually this set of objects that drives the selection of the particular hardcoded rule in the first place.) Further, the set of user rules which can influence the behavior of the particular hardcoded rule is defined within a portion of the hardcoded rule itself. By knowing which particular hardcoded rule is being processed, step 710 can readily obtain the names of the needed user rules.

At step 715, the present invention accesses one object (e.g., a current object) of the set of objects determined at step 710. At step 720, the present invention accesses one user rule (e.g., a current user rule) of the set of user rules determined at step 710. At step 725, the present invention supplies: (1) the name (and classification if available) of the current user rule; and (2) an identification of the current object (e.g., the object's ID) to the user rule search engine of the present invention. The user rule search engine, at step 725, then searches up the object hierarchy 10, starting with the current object, to locate and return the proper definition (or value, in the general case) for the current user rule. The details of the user rule search engine of the present invention are described with respect to FIG. 8. It is appreciated that by having the user rule search engine (step 725) traverse the hierarchy 10 to identify the proper user rule for the current tin object, the particular manner in which the user rule is selected and the particular location from which the user rule is obtained remains transparent to process 615.

At step 730 of FIG. 7A, the properly located user rule definition is then executed and its results are returned and stored. Step 730 is further described in FIG. 7B. At step 740 of FIG. 7A, the present invention checks if any more unprocessed user rules are left in the set of user rules determined at step 710. If so, then a next current user rule is selected at step 745, and processing returns to step 725. If not, then at step 750, all user rules associated with the particular hardcoded rule have been located and executed. At this time, step 750 executes the particular predefined rule (as influenced or modified by the set of user rules) and applies the particular predefined rule to the current object. The results are then stored in memory 102 of system 112.

At step 755 of FIG. 7A, the present invention then checks if more unprocessed objects are located within the set of objects determined at step 710. If so, a next current object is selected at step 760 and processing returns to step 720. If not, then all objects have been processed by the particular hardcoded rule and process 615 returns. It is appreciated that a number of different hardcoded rule sequence orders can be used to determine the next particular hardcoded rule. Assuming the last hardcoded rule has not been executed, processing 615 then returns to step 710 to repeat the overall procedure for the next particular hardcoded rule. When the last hardcoded rule is executed, process 615 returns.

FIG. 7B illustrates internals of step 730. Once the proper definition of a current user rule is identified by the user rule search engine in step 725, step 765 of FIG. 7B determines whether or not the current user rule returns a value (the general case) or if the user rule requires some form of execution or evaluation (the advanced case). This determination is made by an indication found in the "user rule data type" column (e.g., column 3*) located within the row of data structure 40 (FIG. 5) that corresponds to the identified user rule. In the general case, a user rule returns a value that alters the operation of the hardcoded rule and in this case step 775 is entered. At step 775, the present invention executes the identified user rule such that its value is returned. This returned valued is then used by the particular hardcoded rule which itself executes using the returned value of the identified user rule (step 750 of FIG. 7A) as an input.

At step 765 of FIG. 7B, if the identified user rule is an advanced case whereby the user rule can perform additional tasks in addition to returning a value, then step 770 is entered. At step 770, the present invention allows the identified user rule to execute. It is appreciated that the identified user rule has a wide scope of influence at step 770 and can alter or modify other attribute values, constraints, etc., within the objects of hierarchy 10. It is appreciated that in the advanced case, a user rule can also modify the contents of other user rules or itself. At step 770, the particular hardcoded rule then executes. This execution is dependent on any information and/or modifications performed by the identified user rule. The returned or modified values are then used by the particular hardcoded rule which itself executes using the returned or modified values of the identified user rule (step 750 of FIG. 7A).

It is appreciated that the two paths performed by process 730 differ from each other in that step 770 allows the user rule to perform more advanced operations than merely returning a value which is then used within the hardcoded rule. In this way, the user is given more tools with which to tailor hierarchy 10 to a particular described database environment.

USER RULE SEARCH ENGINE

Figure 8:
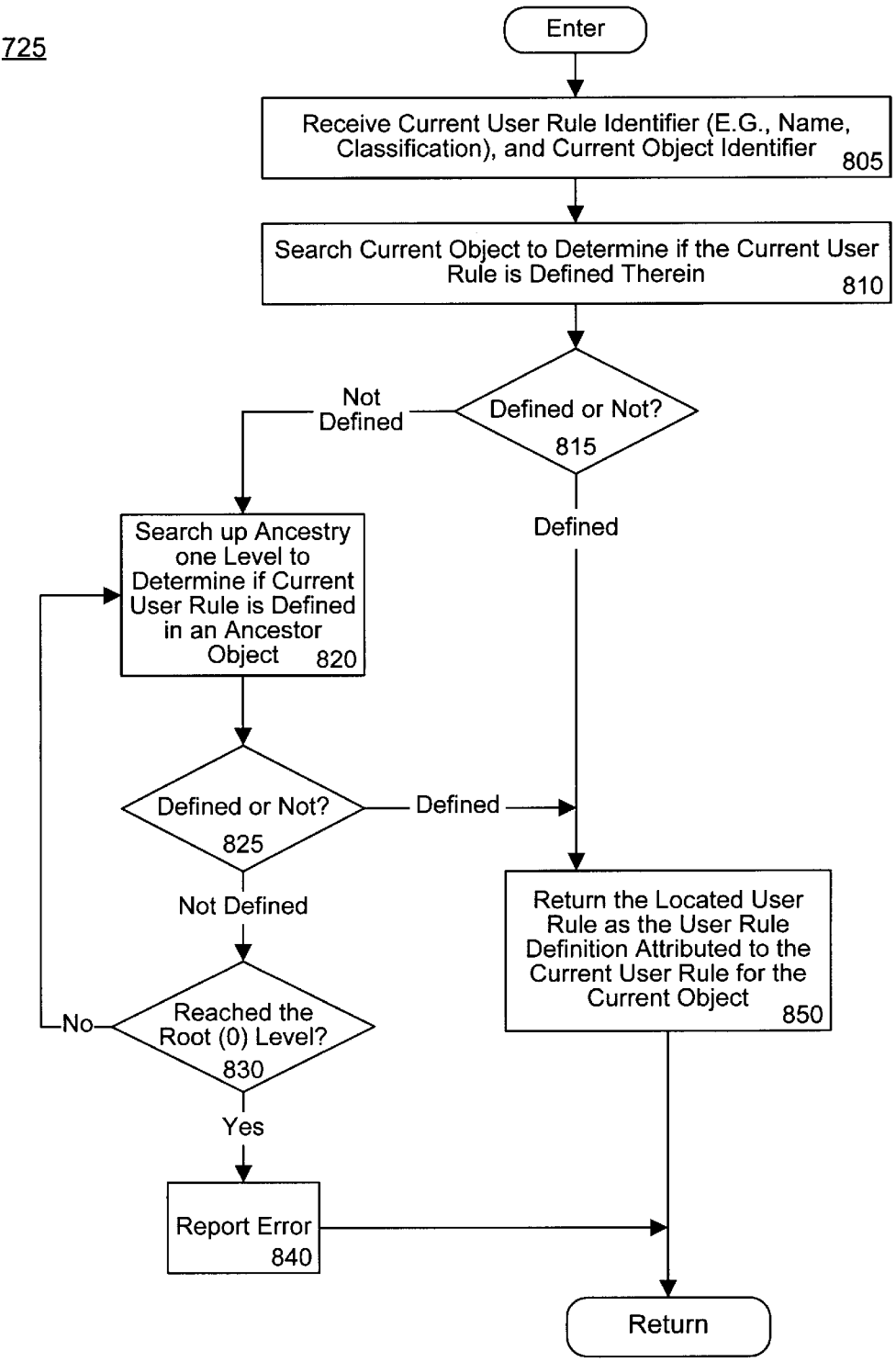
FIG. 8 illustrates a flow diagram of steps of the user rule fetch engine of the present invention that determines an appropriate user rule given a particular object and a particular hardcoded rule name attached to the particular object.

FIG. 8 illustrates the steps within process 710 in accordance with the user rule search engine of the present invention. The steps of process 710 are implemented as program code stored in computer readable memory units of system 112 and are executed by processor 101. At step 805, process 615 of the present invention provides an indication of the current object (e.g., an object ID) and an indication of the current user rule name (and classification, if available).

At step 810, the present invention searches the columns of data structure 40 to determine if a user rule is explicitly (e.g., "particularly") defined for the current user rule in the current object. This is performed, in one embodiment, by checking the rows of data structure 40 of a user rule having the same name as the current user rule and identifying a row having its column field 1* equal to the current object identifier. If a user rule is defined for the current object, then at step 850, the user rule search engine returns the located or identified user rule defined for the current object. It is appreciated that the identified user rule is specific to the current object.

At step 815 of FIG. 8, if the current object does not have an explicitly defined user rule specified for it, then at step 820, the present invention moves up the hierarchy 10 from the current object by one level to the current object's parent object (the "parent object"). At step 820, the present invention then searches the columns of data structure 40 to determine if a user rule for the parent object is explicitly defined for the current user rule. This is performed, in one embodiment, by checking the rows of data structure 40 of a user rule having the same name as the current user rule and identifying a row having its column field 1* equal to the parent object identifier. At step 825, if a user rule is defined for the parent object, then at step 850 it is returned as the identified user rule.

At step 825, if the user rule is not explicitly defined for the parent object, then step 830 checks if the parent object is root object (0). Root object (0) by default should have all user rules (e.g., base rules) explicitly defined therein. Therefore, if the parent object at step 830 is the root object (0), then at step 840, an error condition is reported. Step 710 then exits returning an indication of the error. At step 830, if the parent case is not root object (0), then the user rule fetch engine returns to step 820 and searches upward one hierarchy level above the parent object to the parent's parent object and data structure 40 is again searched.

It is appreciated that flow path defined from step 820, step 825 and step 830 continues searching up one hierarchical level until a user rule is discovered that is defined within an ancestor object having a name that matches the current user rule or until the root level object (0) is reached without locating a defined user rule (error condition). Once a user rule is discovered, it is returned by the user rule fetch engine via step 850 without any indication of the object in which the user rule was located. In this manner, if an object does not have a user rule definition, it is inherited from the nearest ancestor having the user rule definition therein for the current user rule name.

The embodiments of the present invention, the provision of user rules within a performance tuning system, is thus described. While the present invention has been described in particular embodiments, it should be appreciated that the present invention should not be construed as limited by such embodiments, but rather construed according to the below claims.

What is claimed is:

1. In a computer controlled database system having a processor coupled to a bus and a memory coupled to said bus, a method for tailoring hardcoded rules for a database environment, said method comprising the steps of:
   a) storing into said memory a parent-child hierarchy of objects of said database system wherein said parent-child hierarchy comprises a root object, parent objects, and child objects, wherein each child object has one parent object and wherein each parent object has one or more child objects;
   b) defining a plurality of user rules applicable to said database environment wherein, for each respective user rule, each object of said parent-child hierarchy either contains an explicit user rule definition for said respective user rule or inherits its definition for said respective user rule from its closest ancestor object having an explicit user rule definition for said respective user rule;
   c) accessing from said memory a plurality of hardcoded rules which, when executed, tune said database system by operating on objects of said parent-child hierarchy wherein respective hardcoded rules each have at least one user rule defined therein; and
   d) performance tuning said database system to said database environment by executing said plurality of hardcoded rules, wherein the execution of a respective hardcoded rule on a respective object is preceded by the execution of an identified user rule defined with respect to said respective object and which supplies a value used to influence execution of said respective hardcoded rule.

2. A method as described in claim 1 wherein said step b) comprises the steps of:
   b1) explicitly defining values for said plurality of user rules within a first set of objects of said parent-child hierarchy; and
   b2) for each respective user rule, a child object inheriting a defined value for said respective user rule from its closest ancestor object having an explicit definition for said respective user rule as given in step b1).

3. A method as described in claim 2 wherein said step d) comprises the steps of:
   d1) determining if said identified user rule is explicitly defined within said respective object;
   d2) responsive to said d1), provided said identified user rule is so explicitly defined, returning said identified user rule for said respective object; and
   d3) responsive to step d1), provided said identified user rule is not so explicitly defined, searching up ancestor objects from said respective object within said parent-child hierarchy until said identified user rule is explicitly defined within an ancestor object and thereupon returning said identified user rule for said respective object.

4. A method as described in claim 2 further comprising the step of e) defining a base user rule for each user rule of said plurality of rule rules wherein each base user rule contains an explicit default user rule definition and is located within said root object of said parent-child hierarchy.

5. A method as described in claim 1 wherein said step of b) comprises the steps of:
   b1) receiving a definition from a user of a first user rule, said definition of said first user rule including a particular object identifier, a particular hardcoded rule identifier, a particular data type, and a particular data value;
   b2) receiving a definition from a user of a second user rule, said definition of said second user rule including a particular object identifier, a particular hardcoded rule identifier, a particular data type, and a particular data value;
   b3) recording said first user rule into a first location of a data structure by recording its particular object identifier, its particular hardcoded rule identifier, its particular data type, and its particular data value; and
   b4) recording said second user rule into a second location of said data structure by recording its particular object identifier, its particular hardcoded rule identifier, its particular data type, and its particular data value.

6. A method as described in claim 1 wherein said database system is a relational database management system.

7. In a database system, a method of performance tuning attributes organized within objects of a parent-child hierarchy of objects, said method comprising the steps of:
   a) defining a plurality of user rules applicable to a database environment within said parent-child hierarchy of objects wherein, for each respective user rule, each object of said parent-child hierarchy either contains an explicit user rule definition for said respective user rule or inherits its definition for said respective user rule from its closest ancestor object having an explicit user rule definition for said respective user rule; and b) performance tuning said database system to said database environment by executing a plurality of hardcoded rules, wherein the execution of a respective hardcoded rule on a respective object is preceded by the execution of an identified user rule defined with respect to said respective object and which supplies a value used to influence execution of said respective hardcoded rule, said step b) comprising the steps of:

b1) determining if said identified user rule is explicitly defined within said respective object;

b2) responsive to said b1), provided said identified user rule is so explicitly defined, returning said identified user rule for said respective object; and b3) responsive to step b1), provided said identified user rule is not so explicitly defined, searching up ancestor objects from said respective object within said parent-child hierarchy until said identified user rule is explicitly defined within an ancestor object and thereupon returning said identified user rule for said respective object.

8. A method as described in claim 7 wherein said step a) comprises the steps of:

a1) explicitly defining values for said plurality of user rules within a first set of objects of said parent-child hierarchy; and a2) for each respective user rule, a child object inheriting a defined value for said respective user rule from its closest ancestor object having an explicit definition for said respective user rule as given in step b1).

9. A method as described in claim 7 further comprising the step of c) explicitly defining a base user rule definition for each user rule of said-plurality of user rules wherein each base rule is located within a root object of said parentchild hierarchy.

10. A method as described in claim 7 wherein said step of a) comprises the steps of:

a1) receiving a definition from a user of a first user rule, said definition of said first user rule including a particular object identifier, a particular hardcoded rule identifier, a particular data type, and a particular data value;

a2) receiving a definition from a user of a second user rule, said definition of said second user rule including a particular object identifier, a particular hardcoded rule identifier, a particular data type, and a particular data value;

a3) recording said first user rule into a first location of a data structure by recording its particular object identifier, its particular hardcoded rule identifier, its particular data type, and its particular data value; and a4) recording said second user rule into a second location of said data structure by recording its particular object identifier, its particular hardcoded rule identifier, its particular data type, and its particular data value.

11. A method as described in claim 7 wherein said database system is a relational database management system.

12. A computer readable medium containing program instructions stored therein that implement a method a method of performance tuning attributes organized within a parent-child hierarchy of objects, said instructions implementing the steps of:

a) defining a plurality of user rules applicable to a database environment within said parent-child hierarchy of objects wherein, for each respective user rule, each object of said parent-child hierarchy either contains an explicit user rule definition for said respective user rule or inherits its definition for said respective user rule from its closest ancestor object having an explicit user rule definition for said respective user rule; and b) performance tuning said database system to said database environment by executing a plurality of hardcoded rules, wherein the execution of a respective hardcoded rule on a respective object is preceded by the execution of an identified user rule defined with respect to said respective object and which supplies a value used to influence execution of said respective hardcoded rule, said step b) comprising the steps of:

b1) determining if said identified user rule is explicitly defined within said respective object;

b2) responsive to said b1), provided said identified user rule is so explicitly defined, returning said identified user rule for said respective object; and b3) responsive to step b1), provided said identified user rule is not so explicitly defined, searching up ancestor objects from said respective object within said parent-child hierarchy until said identified user rule is explicitly defined within an ancestor object and thereupon returning said identified user rule for said respective object.

13. A computer readable medium as described in claim 12 wherein step a) comprises the steps of:

a1) explicitly defining values for said plurality of user rules within a first set of objects of said parent-child hierarchy; and a2) for each respective user rule, a child object inheriting a defined value for said respective user rule from its closest ancestor object having an explicit definition for said respective user rule as given in step b1).

14. A computer readable medium as described in claim 13 wherein said instructions implement the further step of c) explicitly defining a base user rule definition for each user rule of said plurality of user rules wherein each base rule is located within a root object of said parent-child hierarchy.

15. A computer readable medium as described in claim 13 wherein said step of a) comprises the steps of:

a1) receiving a definition from a user of a first user rule, said definition of said first user rule including a particular object identifier, a particular hardcoded rule identifier, a particular data type, and a particular data value;

a2) receiving a definition from a user of a second user rule, said definition of said second user rule including a particular object identifier, a particular hardcoded rule identifier, a particular data type, and a particular data value;

a3) recording said first user rule into a first location of a data structure by recording its particular object identifier, its particular hardcoded rule identifier, its particular data type, and its particular data value; and a4) recording said second user rule into a second location of said data structure by recording its particular object identifier, its particular hardcoded rule identifier, its particular data type, and its particular data value.

16. A computer readable medium as described in claim 13 wherein said database system is a relational database management system.

* * * * *